Oct. 27, 1942.  F. P. ZIERDEN  2,300,243
HOSE HOUSING
Filed June 7, 1941
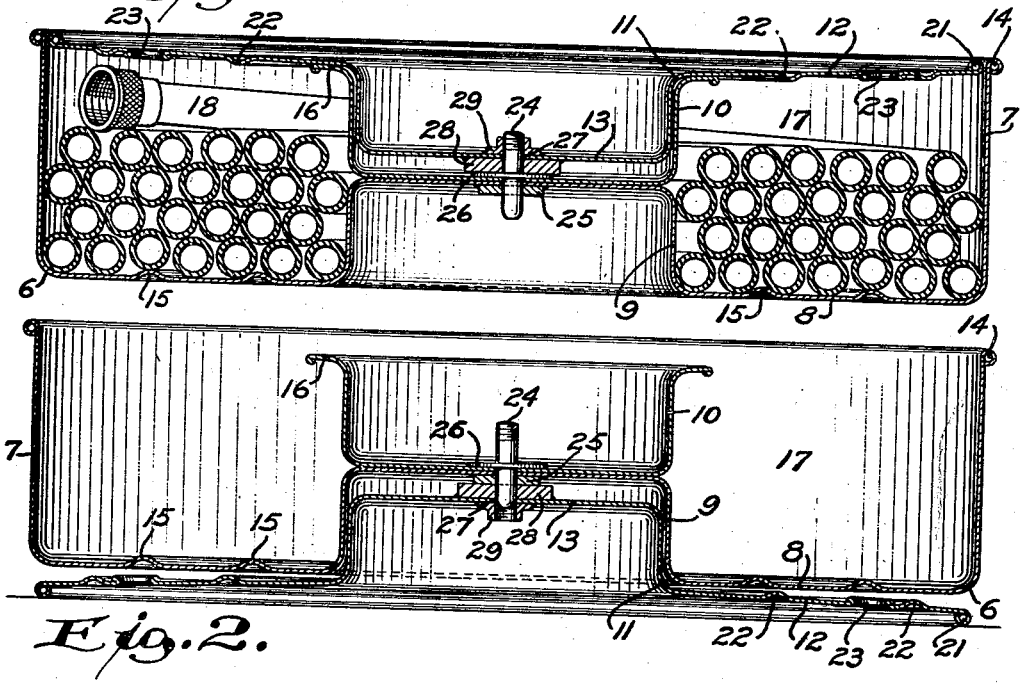
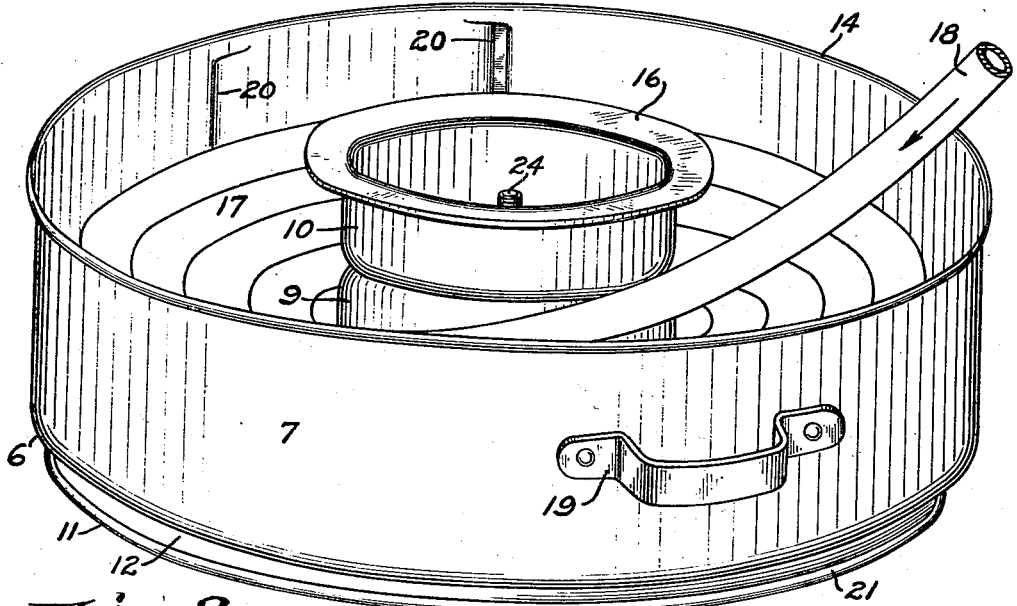
INVENTOR.
Frank P. Zierden
BY Lieber & Lieber
ATTORNEYS.

Patented Oct. 27, 1942

2,300,243

UNITED STATES PATENT OFFICE 2,300,243

HOSE HOUSING

Frank P. Zierden, St. Francis, Wis.

Application June 7, 1941, Serial No. 397,029

16 Claims. (Cl. 242—86)

The present invention relates in general to improvements in the art of facilitating the enclosure of elongated flexible articles for handling and storage purposes, and relates more specifically to improvements in the construction and operation of housings for garden hose, wire, or other elongated flexible bodies.

An object of the invention is to provide an improved housing for hose, wire, or the like which is simple in construction and highly effective in use.

In order to prolong the life of a flexible rubber lawn sprinkling hose to the utmost, it is desirable to drain the water therefrom, to neatly coil the same, and to remove it from the sun and inclement weather, after each use. While various types of hose reels intended to thus protect garden hose in this general manner, have heretofore been proposed and used to some extent, these prior devices were either too complicated and expensive, or too cumbersome to manipulate and handle, or too ineffective to warrant their universal use. These prior devices moreover did not wind the hose loosely enough, and therefore tended to damage the same due to excessive stretching or straining. The prior hose reeling and housing units have not therefore reached any high degree of commercial acceptance and use, for various reasons, although the demand for an efficient and inexpensive device of this type is ever increasing.

It is therefore a more specific object of my present invention, to provide a new and useful housing for hose or the like, which meets all of the above mentioned requirements, in a relatively simple, compact, durable, and inexpensive unit.

Another specific object of this invention is to provide a receptacle for storing hose, wire, or other flexible elongated bodies in coil formation and in compact and neatly coiled condition, without danger of abruptly bending or kinking the hose or other body.

A further specific object of the invention is to provide an improved hose or wire reel assemblage which may be effectively enclosed and readily transported from place to place.

Still another specific object of my invention is to provide an improved circular container for flexible elongated articles such as rubber hose or wire, and wherein the cover for normally enclosing the articles may be readily utilized to assist in the removal thereof.

An additional specific object of the present invention is to provide a simple sheet metal housing for one or more sections or lengths of rubber hose or the like, and which is formed to facilitate reeling of the hose sections into compact coils within the housing.

Another additional specific object of this invention is to provide an improved hose storage and transporting unit which can be manufactured and sold at moderate cost, which occupies least space, and wherein the hose is most effectively concealed and protected.

These and other objects and advantages of the invention will be apparent from the following detailed description.

A clear conception of the several features constituting my present improvement, and of the mode of constructing and of manipulating hose housings embodying the invention, may be had by referring to the drawing accompanying and forming a part of this specification wherein like reference characters designate the same or similar parts in the various views.

Fig. 1 is a transverse central section through one of the improved hose housings, showing a hose coiled and completely concealed within the enclosed housing;

Fig. 2 is a similar section through the empty hose housing, showing the main casing pivotally supported upon the inverted cover in readiness for loading;

Fig. 3 is a perspective view of the assemblage as in Fig. 2, showing a hose section being coiled within the main casing; and Fig. 4 is a side elevation of the assemblage closed as in Fig. 1, but resting upon the supports or feet formed on the periphery of the main casing, the showing being drawn to greatly reduced scale.

While the improved storage and carrier housing is shown herein as being formed of sheet metal and especially adapted to cooperate with one or more sections or rubber garden hose or the like, it is not my desire or intent to thereby unnecessarily restrict the scope or utility of the invention.

Referring to the drawing, the improved garden or lawn hose housing shown therein, comprises in general a cup-shaped circular main casing 6 having a cylindrical peripheral wall 7, a flat bottom or side wall 8, and a central inverted socket or cup-shaped portion 9, all formed of a single piece of sheet metal; a socketed or cup-shaped central element 10 permanently secured to the casing portion 9 concentric with the main casing 6; and a closure cover 11 having a relatively flat disk-like wall 12, and a central cup-shaped portion 13 interchangeably cooperable with the casing portion 9 and with the element 10, the wall 12 and cover portion 13 likewise being formed of a single piece of sheet metal.

The peripheral wall 7 of the main casing 6 may be provided with a stiffening ring or rim 14, and the side wall 8 thereof may be reenforced by means of annular corrugations 15; and the casing portion 9 and element 10 may be permanently united by rivets, welding or otherwise to form a central cylindrical hub. The hub thus produced may also be provided with a retaining flange 16, and cooperates with the outer casing wall 7 to form an annular space 17 within which a flexible hose 18 may be coiled and confined as shown in Figs. 1 and 3. One side of the outer wall 7 of the casing 6, may also be provided with a carrying handle 19, and the opposite side thereof may be provided with integral triangular detents forming supporting feet 20 for retaining the main casing 16 in upright position as illustrated in Fig. 4.

The disk-like wall 12 of the closure cover 11 is provided with a peripheral bead or rim 21 adapted to lie within and to cooperate with the main casing rim 14 as shown in Fig. 1 to provide a fairly tight closure, and to also serve as a supporting base as in Fig. 2. The closure cover 11 may also be provided with annular reenforcing corrugations 22 formed in the wall 12 thereof, and this wall has a pair of diametrically opposite finger holes 23 therein for facilitating handling and manipulation of the cover. The central portion 13 of the cover, which is formed integral with the wall 12, is adapted to be interchangeably inserted within either the casing portion 9 or the cup-shaped hub element 10, as shown in Figs. 2 and 1 respectively.

Mounted centrally within the casing portion 9 and element 10, is a fixed pivot pin 24 which may be welded or otherwise secured to the portion 9 and element 10, and to bearing plates 25, 26 disposed within these cup-shaped parts respectively. The end of the pin 24 which projects within the element 10, is screw threaded, while the opposite pin end which is disposed within the casing portion 9, is smooth. The smooth or unthreaded end of the pin 24 is shorter than the threaded end, by an amount at least equal to the length of the threaded portion. The central cover portion 13 is provided with a concentric hole 27 adapted to be pierced by both ends of the pin 24, and has a bearing plate 28 secured to one side and a threaded nut 29 secured to the opposite side thereof, in any suitable manner as by welding. The nut 29 is adapted to coact with the screw threaded end of the pin 24 as in Fig. 1, when the closure plate 11 is used as a cover; and the bearing plate 28 is adapted to coact with the smooth end of the pin 24 and with the bearing plate 25 of the main casing, when the cover plate 11 is being used as a pivotal support for the casing 6 as in Fig. 2. The cover hub is preferably made of sufficient height so that it will enter the recesses of the casing hub before the pin 24 is engaged by the cover, and thus provides a guide for directing the cover hole 27 centrally of the pin.

The main casing 6, central element 10, and closure cover 11 may all be formed of sheet metal of desirable thickness, in any suitable manner, and when properly constructed, the improved hose housing may be used in the following manner. When the casing is empty, and it is desired to coil a hose 18 therein, the main casing 7 may be positioned upon the cover plate 11 as illustrated in Fig. 2, whereupon the casing 7 is free to revolve about the central axis of the pin 24 and upon the bearing plate 28. One end of the hose 18 may then be placed within the annular recess 17, and by merely advancing the relatively stiff hose 18 tangentially and periodically into this recess, the hose will be neatly coiled, about the central hub provided by the casing portion 9 and element 10. One or more sections of the hose may be inserted within the main casing 7 in this manner, and will assume a position substantially as illustrated in Fig. 1. The loaded casing section 7 may then be lifted freely from the bearing plate 28 of the cover 11, and the cover may be reversed and applied to the threaded end of the pin 24 as illustrated in Fig. 1. After the casing has been thus loaded and closed, it may be transported with the aid of the handle 19 and the feet 20 may be utilized to support the casing in upright position as illustrated in Fig. 4. In order to gain access to the enclosed hose 28, the cover plate 11 may be unscrewed from the threaded end of the pin 24 by applying the fingers to the holes 23 in the cover, in an obvious manner.

From the foregoing detailed description it will be apparent that my present invention provides an improved hose housing which is not only simple, durable and compact in construction, but which is moreover adapted to effectively conceal and protect a hose while neatly coiled therein. The water will obviously be drained from the hose, during insertion thereof within the main casing 7, and the cover plate 11 will effectively confine the hose within the recess 17, while the central hub within the casing 7 will insure proper coiling of the hose without kinking. The entire assemblage can obviously be manufactured and sold at extremely moderate cost, and has proven highly successful in actual use. The assemblage can be easily transported with the aid of the handle 19 and may be set in upright position with the aid of the feet 20. The cover plate 11 obviously serves the dual function of pivotally supporting the casing 6 during loading, as in Fig. 2, and of providing a closure for the casing 7 when loaded, as in Fig. 1. The assemblage is obviously extremely neat in appearance, occupies minimum space, and has sufficient capacity to accommodate one or more ordinary lengths of standard garden or lawn hose 18.

It should be understood that it is not desired to limit this invention to the exact details of construction or to the precise mode of use, herein shown and described, for various modifications within the scope of the claims may occur to persons skilled in the art.

I claim:

1. A hose housing comprising, a main circular cup-shaped casing having a central internal hub provided with opposite end recesses, and a circular plate having a central projection interchangeably cooperable with said hub recesses to provide either a closure or a support for permitting rotation of said casing thereon.

2. A hose housing comprising, a main circular cup-shaped casing having a central hub and a pin projecting axially in opposite directions away from a medial transverse plane of said hub, and a circular plate having its central portion interchangeably cooperable with said pin ends to provide either a closure or a support for permitting rotation of said casing thereon.

3. A hose housing comprising, a circular casing having a central pin provided with oppositely projecting ends, and a circular plate having a central recessed portion interchangeably co-operable with the opposite ends of said pin to provide either a closure or a support for permitting rotation of said casing thereon.

4. A hose housing comprising, a cup-shaped casing having a fixed central pin provided with oppositely projecting ends one of which is threaded, and a disk having a central recessed and internally threaded portion cooperable with the threaded end of said pin to provide a closure for said casing, and with the opposite end of said pin to provide a support for permitting rotation of the casing thereon.

5. A hose housing comprising, a circular sheet-metal casing having an annular hose confining recess therein and oppositely inwardly directed central sockets, a pin rigidly secured to the central portion of said casing and having opposite ends extending outwardly from the bottoms of said sockets, and a plate having a central projection adapted to fit said casing sockets and interchangeably cooperable with the opposite ends of said pin.

6. A hose housing comprising, a main casing having a peripheral annular wall and a central portion forming a depression approximately one-half the height of said wall, a cup-shaped element secured to said central casing portion and co-operating therewith and with said wall to provide an annular hose confining recess, and a disk member having a central projection adapted to interchangeably coact with said casing depression and with said element.

7. A hose housing comprising, a main casing having a peripheral annular wall and a central portion forming a depression approximately one-half the height of said wall, a cup-shaped element secured to said central casing portion and co-operating therewith and with said wall to provide an annular hose confining recess, a disk member having a central projection adapted to interchangeably coact with said casing depression and with said element, and a pivot pin carried by said casing within said depression and extending into said element, said pin being interchangeably cooperable with said disk projection when said disk member is disposed on opposite sides of said casing.

8. A hose housing comprising, a main casing having a peripheral annular wall and a central portion forming a depression approximately one-half the height of said wall, a cup-shaped element secured to said central casing portion and cooperating therewith and with said wall to provide an annular hose confining recess, a disk member having a central projection adapted to interchangeably coact with said casing depression and with said element, and a pin secured to said casing and having its opposite ends formed to centralize said disk projections within said depression and said element.

9. A hose housing comprising, a main casing having a peripheral wall and a central hub portion provided with oppositely directed depressions, a pin mounted centrally of said casing and having opposite ends extending into said depressions, and a cover plate having a central projection adapted to fit within said hub depressions and also having a central hole formed for reception of said pin ends.

10. A hose housing comprising, a main circular casing having a peripheral wall and a central hub portion provided with oppositely directed circular depressions, a pin fixedly secured centrally of said casing and having opposite smooth and threaded ends respectively extending into said depressions, and a cover plate having a central circular projection adapted to fit within said hub depressions and provided with a central hole cooperable with said pin ends, said hole having internal screw threads cooperable with the threads of said threaded pin end and said smooth pin end being shorter than said threaded end by an amount at least equal to the length of the threaded pin portion.

11. A hose housing comprising, a main casing having a peripheral wall and a central hub portion provided with oppositely directed depressions, a pin secured centrally of said casing and having opposite ends extending into said depressions, and a cover plate having a central circular projection adapted to be inserted within said hub depressions and provided with a central hole co-operable with said pin ends, said pin ends being shorter than the depths of said depressions whereby said cover projection must enter said depressions before said pin ends can enter said hole.

12. A hose housing comprising, a main circular cup-shaped casing having a fixed central hub therein provided with opposite inwardly directed end sockets, a circular plate having a central projection interchangeably co-operable with said sockets, and means for fastening said plate projection within one of said hub sockets.

13. A hose housing comprising, a main circular cup-shaped casing having a fixed central hub therein provided with opposite inwardly directed end sockets, a circular plate having a central projection interchangeably co-operable with said sockets and provided with a central opening, and pins projecting from the bottoms of said sockets and being co-operable with said plate opening to centralize said projection within said sockets.

14. A hose housing comprising, a main circular cup-shaped casing having a fixed central hub therein provided with opposite inwardly directed circular end sockets, a plate having a circular central projection interchangeably rotatably co-operable with said sockets, and means for fastening said plate projection within one of said hub sockets when said projection is rotated within said socket.

15. A hose housing comprising, a main circular cup-shaped casing having a fixed central hub therein provided with opposite inwardly directed circular end sockets, a circular plate of approximately the same diameter as the interior of said main casing and having a central circular projection interchangeably rotatably co-operable with said hub sockets, and pivot pins projecting from the bottoms of said sockets and being co-operable with a central opening in said plate projection.

16. A hose housing comprising, a main circular cup-shaped casing having a fixed central hub therein provided with opposite inwardly directed end sockets of approximately equal depth, a circular plate having a central projection of approximately the same height as the depth of said sockets interchangeably co-operable with the latter, and pivot means within said sockets co-operable with a central opening in said plate projection.

FRANK P. ZIERDEN.